Aug. 29, 1961   C. L. ENGLIS ET AL   2,998,217
QUICK-OPENING LINE SUPPORTING CLAMP
Filed July 6, 1959   2 Sheets-Sheet 1
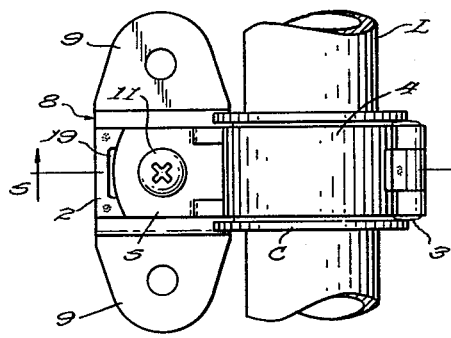
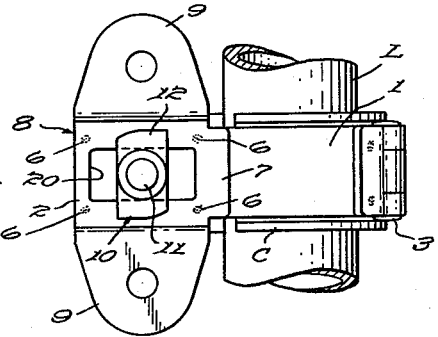
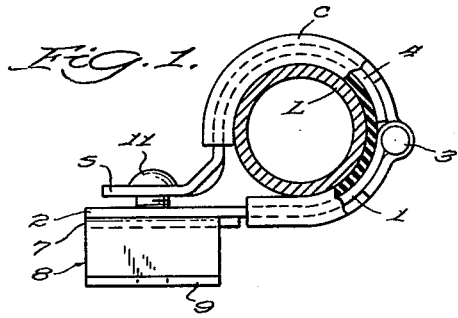
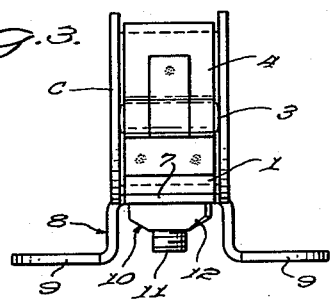
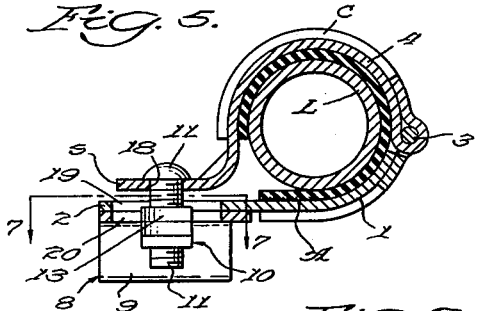
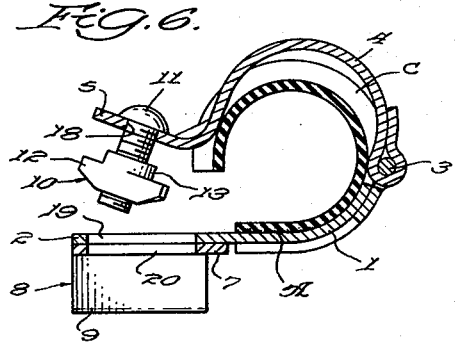
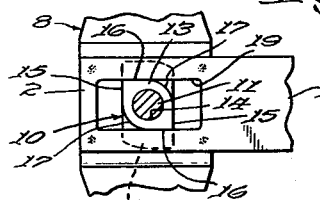
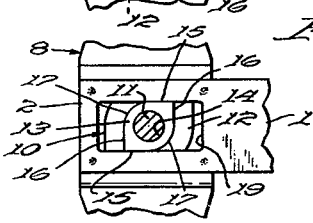
Inventors:
Clifton L. Englis
Howard P. Thomas.
By
Harold J. LeVesconte
Atty.

Aug. 29, 1961     C. L. ENGLIS ET AL     2,998,217
QUICK-OPENING LINE SUPPORTING CLAMP
Filed July 6, 1959     2 Sheets-Sheet 2
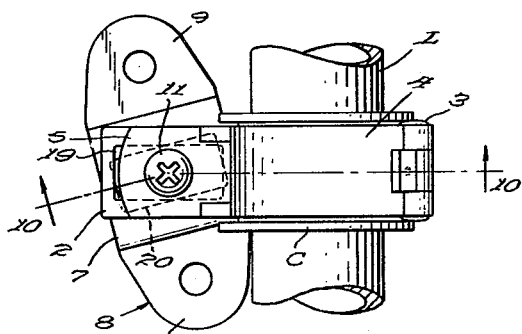
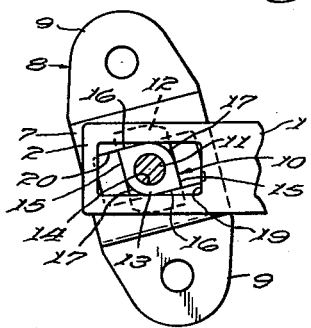
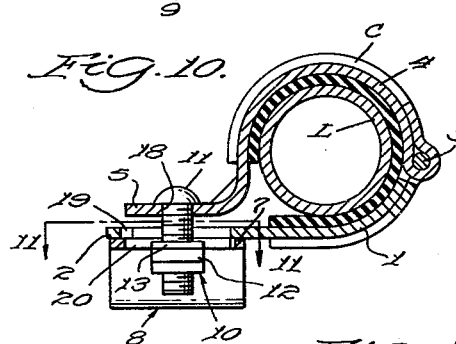
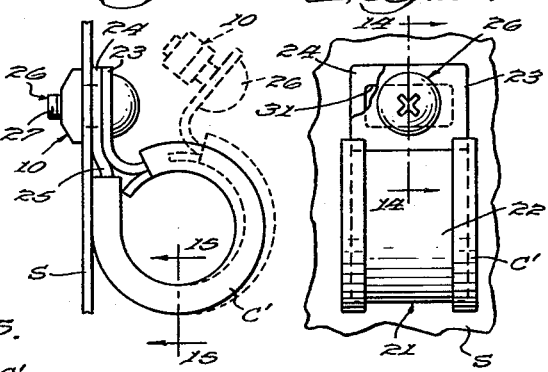
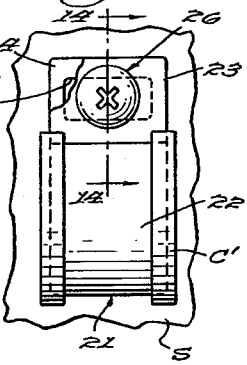
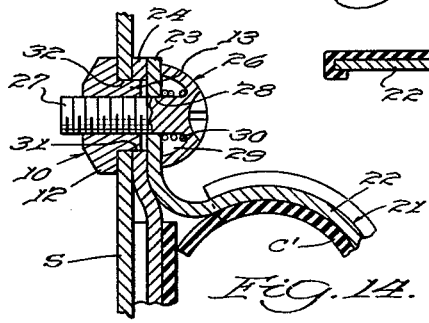
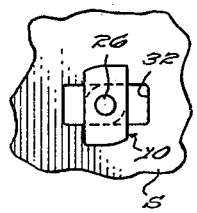
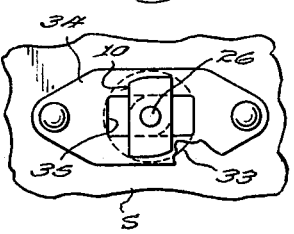
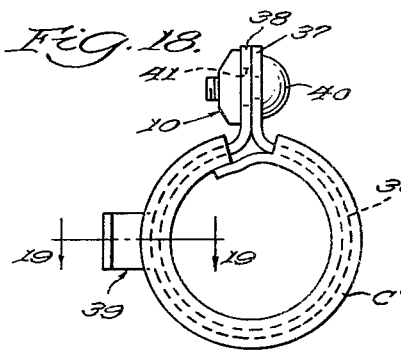
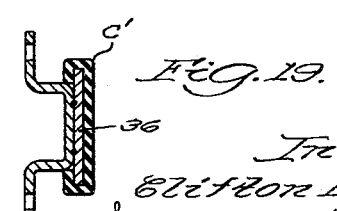
Inventors:
Clifton L. Englis
and Howard P. Thomas.
By
Harold J. DeVisconte
Atty.

United States Patent Office 2,998,217  
Patented Aug. 29, 1961

2,998,217  
QUICK-OPENING LINE SUPPORTING CLAMP  
Clifton L. Englis, Tujunga, and Howard P. Thomas, Hollywood, Calif., assignors to T-A Mfg. Corp., Los Angeles, Calif., a corporation of California  
Filed July 6, 1959, Ser. No. 825,199  
4 Claims. (Cl. 248—74)

This invention relates to line supporting devices for mounting components such as tubular conduits or electrical conductors or groups thereof upon a wall, bulkhead or other structural component.

The principal object of the invention is to provide a line supporting clamp which is closed by screw threaded fastening devices having the capacity for quick opening and closing of the clamp incident to the removal or insertion of the line or lines to be supported thereby without the necessity of the complete removal of the fastening means from the clamp.

Another object of the invention is to provide a line supporting clamp including quick operating screw threaded fastening devices in which the said fastening devices serve additionally as the securing means for mounting the clamp on the structural element on which the line is to be supported.

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which specification:

FIGS. 1 through 8 relate to a first embodiment of the invention in which:

FIG. 1 is a side elevation of a clamp enclosing a tubular conduit, said clamp including the quick acting closing means and having a mounting bracket permanently fixed to the clamp, FIG. 2 is a top elevational view of the clamp shown in FIG. 1, FIG. 3 is a view looking from the left hand side of FIG. 1, FIG. 4 is a view of the clamp looking from the bottom of FIG. 1, FIG. 5 is a transverse sectional view taken on the line 5—5 of FIG. 2, FIG. 6 is a view similar to FIG. 5 but showing the fastening device released and the clamp partly opened, FIG. 7 is a fragmentary view taken on the line 7—7 of FIG. 5 showing the nut of a fastening device in securing position, and FIG. 8 is a view similar to FIG. 7 but showing the nut component turned for entry through the slot in one end of the clamp and in the supporting bracket, FIGS. 9, 10 and 11 illustrate a modification of the first embodiment of the invention in which the clamp, per se, is separate from the supporting bracket by the clamp fastening device and in which:

FIG. 9 is a plan view as viewed from the top of FIG. 10,

FIG. 10 is a transverse sectional view taken on the line 10—10 of FIG. 9, and

FIG. 11 is a fragmentary sectional view taken on the line 11—11 of FIG. 10,

FIGS. 12 through 19 illustrate a second embodiment of the invention in which the clamp body is formed from a single piece of resilient metal as distinguished from the hinged construction of the preceding figures and in which:

FIG. 12 is a side elevational view of a one piece clamp secured to a wall by a quick opening, screw threaded fastening means which serves additionally to secure the ends of the clamp together, FIG. 13 is a view taken from the right hand side of FIG. 12, a portion of the clamp end being broken away to show structural detail concealed beneath the broken away portion, FIG. 14 is an enlarged, transverse, fragmentary, sectional view taken on the line 14—14 showing an alternative form of fastening device, FIG. 15 is a transverse, sectional view taken on the line 15—15 of FIG. 12, FIG. 16 is a fragmentary view from the left hand side of FIG. 12 showing the securing slot formed in the wall on which the clamp is mounted, FIG. 17 shows an alternative form of mounting means on a wall structure comprising a slotted plate fixed to the rear face of the wall, FIG. 18 is a side elevational view of a line supporting clamp having the supporting bracket fixed thereto at a point other than the clamp closure, FIG. 19 is a transverse sectional view taken on the line 19—19 of FIG. 18.

Referring first to FIGS. 1 through 8, the illustrated embodiment of the invention comprises a generally circular, line encircling clamp including a base member 1 having a tangentially extending shank portion 2 and hingedly connected by a pin 3 to a front portion 4 which completes the line embracing circle and also includes a shank portion 5 adapted to overlie and extend parallel to the shank portion 2. As here shown, the hinge portions are formed integrally with the respective clamp portions, but it will be understood that any other type of interconnecting hinge may be employed. As is usual in line supports of this character, the clamp carries a cushion element C lining the inner face thereof and either extending along each side edge of the clamp member as in hinged type clamps with the end thereof adjacent the shank 2 of the base portion being secured by suitable means such as adhesive A or, as will be later discussed, extending over the side edges of the clamp.

The shank portion 2 is permanently attached by any suitable means as, for example, welds 6 to the center laterally offset portion 7 of a hat-shaped bracket 8, the laterally extending foot portions 9, 9 thereof being attachable by bolts, rivets or equivalent means to the structure on which the line is to be mounted. The space between the offset center portion of the bracket and the surface to which it is attached forms a clearance space for a nut 10 which together with the screw 11 engaged thereby forms the fastening means for closing the clamp about the line L to be supported by the clamp.

The nut 10 is like that disclosed in the prior application of Clifton L. Englis, one of the present applicants, said application being identified as Serial No. 817,279, filed June 1, 1959, and includes a locking portion 12 of generally elongated rectangular configuration as viewed in plan and surmounted by a centrally disposed neck portion 13 through the center of which the threaded bore 14 extends; said neck portion having side faces 15, 15 formed as continuations of the side surfaces of the locking portion and end faces 16, 16 disposed at right angles thereto and spaced the same distance from the axial line of the bore 14. The diagonally opposite corners joining the faces 15 and 16 which would constitute leading edges as the nut is rotated in the direction of a screw entering the threaded bore 14 at the end thereof in the neck 13 are cut away on a radius based on the axial line of the bore and extending to said surfaces at right angles thereto as at 17, 17. The shank portion 5 of the clamp has a circular hole 18 therein which accommodates the body of the screw 11 and the shank 2 of the clamp and the portion 7 of the bracket 8 have registering rectangular slots 19 and 20, respectively, which allow the locking portion 12 of the nut to pass through freely but with very slight clearance, see FIG. 8. In use, assuming that the clamp is open as, for example, in FIG. 6 and it is desired to close the clamp about a line placed therein, the nut is backed off on the screw a sufficient distance so that it will pass through both the slots 19 and 20 when the clamp is closed about the line. Then upon rotating the screw 11 in a direction to draw the nut along the screw toward the head thereof the first portion of the rotation will turn the nut in a clockwise direction as viewed in FIG. 7 and 8 and move it from the position shown in FIG. 8 to that in FIG. 7 at which time the remaining corners formed by the juncture of the faces 15 and 16 engage the sides of the slots 19 and 20 and prevent further rotation of the nut. The nut has rotated 90 degrees from the position shown in FIG. 8 so that the ends of the locking portion 12 which extend beyond the neck are disposed transversely to the slots 19 and 20 and thus engage the underface of the bracket. Continued tightening of the screw will bring the clamp to the desired degree of tightness about the line L. When it is desired to open the clamp to remove the line, the screw is rotated in a counterclockwise direction as viewed in FIG. 7 and 8 and when this has been done to the sufficient extent to relieve the frictional engagement of the nut with the underface of the bracket, it will turn in the same direction until the engagement of the faces 15 of the neck engage the sides of the slots 19 and 20 fringing the locking portion of the nut until it is in registry with the slots 19 and 20 at which time the clamp can be readily opened.

Referring next to FIGS. 9, 10 and 11, the type of line supporting clamp shown is like that shown in the preceding figures, wherefore, the same numbers have been applied. The differences are that the shank 2 is not welded to the bracket 8 and the neck portion 13 of the nut extends only into the slot 20 of the bracket on so that the clamp may be positioned on the bracket at any angular position about the axis of the screw 11 as shown in these figures. Also when the clamp is detached from the bracket this shortened neck portion will extend into the slot 19 in the shank 2 of the clamp and permit the clamp to be temporarily secured on the line as it is detached from the bracket. Thus the quick locking action of the nut makes it possible to initially and temporarily secure the clamp to the line and then insert the nut through the opening 20 in the bracket for final mounting of the line. Likewise it will be obvious that, if desired, the clamp can be removed from the bracket while being still closed about the line and thus be removed with the line.

In instances where the fluid conduit to be supported is of small diameter, i.e., ½" or less, or the line to be supported consists of a bundle comprising a plurality of electrical conductors which can be passed through a narrow clamp opening one at a time, a clamp having hinged portions is unnecessary and therefore, the clamp may be formed of a single strip of metal which can be sprung to an open position such as shown in dotted lines in FIG. 12 without over stressing the material. In FIGS. 12 through 15, the clamp is formed from a single strip of metal 21 comprising a body portion 22 which is bent into a line enclosing circle with the ends 23 and 24 of the strap disposed generally parallel to each other and tangential to the circle of the body portion 22. As is usual in such clamps, the line engaging body portion thereof carries a resilient cushion C' covering the inner face thereof and having edge portions which embrace the side edges of the strap to make the cushion self-securing thereon as best shown in FIG. 15. Also, to afford clearance for the cushion edges on the outer face of the clamp, the end 24 thereof is provided with an offset bend 25. The cushion at the end thereof adjacent the end portion 23 of the clamp is provided with a lip extension which lies against the opposite end of the cushion to completely encircle the line as best seen in FIG. 12.

The closing screw 26 carries the same type of self-locking and releasing nut 10 as previously described wherefore, the same numbers have been applied thereto. The body 27 of the screw 26 extends through a hole 28 in the end 23 of the strap and the underside of the screw head contains an annular recess 29 surrounding the screw body in which a compression spring 30 is housed, said spring normally tending to urge the screw head away from the clamp. The end 24 of the strap is provided with a transversely extending slot 31 through which the body of the nut may pass and the structure wall S to which the clamp is mounted is provided with a corresponding slot 32. As shown in FIG. 14, the neck 13 of the nut enters both slots 31 and 32 thus locating the clamp non-rotatively on the structure. It will be understood, however, that the neck 13 may be shortened as shown in FIG. 10 to permit optional angular positioning of the clamp about the axis of the securing screw. It will be obvious, further, that the illustrated spring biased screw construction may be used in any of the forms of the clamp illustrated or that the first form of screw be similarly used as may be desired.

Considering FIGS. 16 and 17, FIG. 16 shows the mounting slot 32 in the structure wall. FIG. 17 shows a variation thereof in which a circular hole 33 is formed in the structure wall and a plate 34 having a rectangular slot 35 for reception of and locking engagement with the nut is placed over the circular hole and secured to the structure wall. Such structure is employed in those instances in which it is more convenient to drill holes in the structure wall than form the rectangular slot therein for reception of the nut.

Referring finally to FIGS. 18 and 19, there is shown a third form of clamp in which the circular clamp body 36 is formed with end portions 37 and 38 extending parallel to each other and radially from the axis of generation of clamp body, and in which the supporting bracket 39 is attached to the strap body at a point other than at the strap ends. The clamp is closed by a screw 40 and a nut 10 of the type previously described, the screw being of either form previously described and the strap end 38 having a rectangular slot 41 therein through which the nut may be projected and then turned to locking position in the manner already described. Obviously also, the clamp body may be hinged as in the first described form instead of the one piece strap illustrated.

While in the foregoing specification, there have been described certain presently preferred embodiments of the invention, it will be understood that such disclosures are by way of example only and that the invention embraces as well all such changes and modifications in the parts and in the construction, combination and arrangement of parts as shall come within the purview of the appended claims.

We claim:

1. In a quick-opening, line supporting clamp, an elongated line embracing component having an intermediate portion shaped to surround the line to be supported and having the ends thereof normally disposed in adjacent parallel relation to each other and projecting outwardly beyond said intermediate portion, one of said ends having an opening extending therethrough for reception of the body of a screw and the other of said ends having an elongated rectangular slot extending therethrough disposed centrally with respect to said opening in said one end, a bracket means separately fixed to the side of said other clamp end remote from said one clamp end; said bracket having a rectangular opening therethrough disposed in alignment with said rectangular opening in said other clamp end, and quick detachable means for connecting and disconnecting said ends comprising a screw having a threaded body extending through said opening in said one end with the screw head engaging the face of said one end remote from said other end and a nut threadedly engaging said body of said screw; said nut having an elongated rectangular body closely fitting said aligned slots and a neck portion on the end thereof facing said screw and disposed within said slots engaging the sides thereof, said neck portion having a peripheral configuration permitting rotative movement of said nut only between a position in which the body portion thereof may pass through said slots and another position in which said body portion is moved transverse to said slot incident to a direction of rotation of said screw entering the threads of said nut; said bracket having a foot portion laterally offset from the side of the portion thereof secured to said other clamp end with resultant provision of clearance for the body of said nut when projected through said aligned slots; the end face of said body of said nut adjacent to said neck portion thereof being engageable with the side of said bracket means remote from said other clamp end when said nut is turned to said rectangular position.

2. A line supporting clamp as claimed in claim 1 in which said ends of said line embracing component extend substantially radially of the center line of the line embracing space defined by said intermediate portion of said component.

3. A line supporting clamp as claimed in claim 1 in which said line embracing component comprises two members hingedly interconnected at a point substantially diametrically opposite the point of adjacency of said ends thereof.

4. A line supporting clamp as claimed in claim 1 in which said ends of said line embracing component are disposed substantially tangentially with respect to the periphery of said line embracing portion of said component.

References Cited in the file of this patent

UNITED STATES PATENTS

| | | |
|---|---|---|
| 915,772 | Keedwell | Mar. 23, 1909 |
| 2,119,764 | Young | June 7, 1938 |
| 2,396,837 | Ellinwood | Mar. 19, 1946 |
| 2,440,469 | Goddard | Apr. 27, 1948 |
| 2,676,680 | Kindorf | Apr. 27, 1954 |